US006388224B1

(12) United States Patent
Torvinen

(10) Patent No.: US 6,388,224 B1
(45) Date of Patent: May 14, 2002

(54) SYSTEMS FOR ROBOTIC STUD ARC WELDING WITHOUT FERRULE

(75) Inventor: Jukka M. Torvinen, Raleigh, NC (US)

(73) Assignee: ABB T&D Technology Ltd., Zurich (CH)

( * ) Notice: Subject to any disclaimer, the term of this patent is extended or adjusted under 35 U.S.C. 154(b) by 0 days.

(21) Appl. No.: 09/473,874

(22) Filed: Dec. 28, 1999

(51) Int. Cl.$^7$ .............................. B23K 9/00; B23K 11/04
(52) U.S. Cl. ............................. 219/99; 219/98; 219/127
(58) Field of Search .............................. 219/99, 98, 127

(56) References Cited

U.S. PATENT DOCUMENTS

| | | | | |
|---|---|---|---|---|
| 3,586,814 A | * | 6/1971 | Pease | 219/98 |
| 3,852,559 A | * | 12/1974 | Tauern | 219/98 |
| 4,117,297 A | | 9/1978 | Scholle | 219/98 |
| 4,163,888 A | | 8/1979 | Ettinger | 219/98 |
| 4,297,560 A | * | 10/1981 | Netzsch | 219/130.01 |
| 4,315,129 A | * | 2/1982 | Wilkinson et al. | 219/99 |
| 4,469,928 A | | 9/1984 | Wilkinson et al. | 219/98 |
| 4,562,329 A | * | 12/1985 | Minton | 219/99 |
| 4,617,445 A | * | 10/1986 | Shaw et al. | 219/98 |
| 4,620,079 A | | 10/1986 | Allmann et al. | 219/98 |
| 4,743,732 A | * | 5/1988 | Alpatiev et al. | 219/99 |
| 4,804,811 A | * | 2/1989 | Raycher et al. | 219/98 |
| 4,868,366 A | * | 9/1989 | Joseph et al. | 219/137.71 |
| 5,068,511 A | | 11/1991 | Meyer, Sr. | 219/98 |
| 5,070,226 A | * | 12/1991 | Raycher et al. | 219/98 |
| 5,130,510 A | | 7/1992 | Zeigler et al. | 219/99 |
| 5,138,128 A | * | 8/1992 | Van Rhyn et al. | 219/99 |
| 5,252,802 A | * | 10/1993 | Raycher | 219/98 |
| 5,321,226 A | * | 6/1994 | Raycher | 219/98 |
| 5,345,054 A | * | 9/1994 | Li | 219/98 |
| 5,384,445 A | | 1/1995 | Nakagami | 219/98 |
| 5,403,988 A | * | 4/1995 | Kawada et al. | 219/98 |
| 5,460,536 A | * | 10/1995 | Cullen | 439/289 |
| 5,542,524 A | | 8/1996 | Sakoda | 198/409 |
| 5,565,116 A | * | 10/1996 | Barton et al. | 219/98 |
| 5,662,820 A | * | 9/1997 | Schwiete et al. | 219/99 |
| 5,779,609 A | * | 7/1998 | Cullen et al. | 483/69 |
| 5,824,987 A | | 10/1998 | Volk | 219/98 |
| 6,163,005 A | * | 12/2000 | Easterday | 219/99 |
| 6,172,334 B1 | * | 1/2001 | Harris et al. | 219/147 |
| 6,175,094 B1 | * | 1/2001 | Easterday | 219/98 |

OTHER PUBLICATIONS

ASM Committee on Stud Welding, "Stud Welding," Metals Handbook, Ninth Edition, vol. 6: Welding, Brazing and Soldering, American Society for Metals, 19 pp. 729–738.
Kirk–Othmer, *Concise Encyclopedia of Chemical Technology*, pp. 2151–2154.
Emhart Automated Fastening Equipment, Website printout Dec. 7, 1999 (2 pages).
Emhart Fastening Teknologies—Tucker Drawn Arc Welding Process, Website printout Nov. 29, 1999 (1 page).
Emhart Automated Fastening Equipment, Website printout Nov. 29, 1999 (2 pages).

* cited by examiner

*Primary Examiner*—Tom Dunn
*Assistant Examiner*—Zidia Pittman
(74) *Attorney, Agent, or Firm*—Woodcock Washburn LLP

(57) ABSTRACT

Apparatus and methods for arc welding a stud to a workpiece without the use of a ferrule are disclosed. Apparatus according to the invention include a stud arc welding gun having a spacer at a distal end thereof, and a chuck adapted to receive a stud having a diameter of more than about $\frac{3}{8}$ inch. A stud feeding device is coupled to the gun for automatically loading studs into the gun. The stud feeding device can include a bowl feeder and a stud feeding conduit via which studs are transferred from the bowl feeder to the stud gun. A gun positioning device, such as an arm of a robot, is coupled to the gun, and automatically positions the gun such that the spacer is against a receiving surface of the workpiece. A controller coupled to the stud gun initiates a stud arc welding process to arc weld the stud to the workpiece.

13 Claims, 7 Drawing Sheets

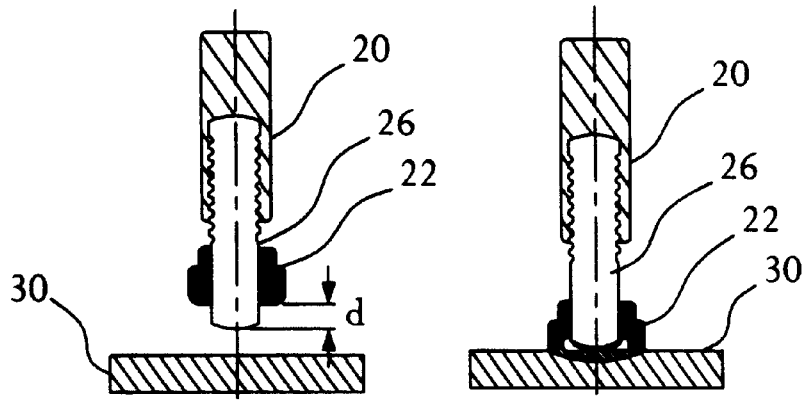
FIG. 4A (PRIOR ART)  FIG. 4B (PRIOR ART)
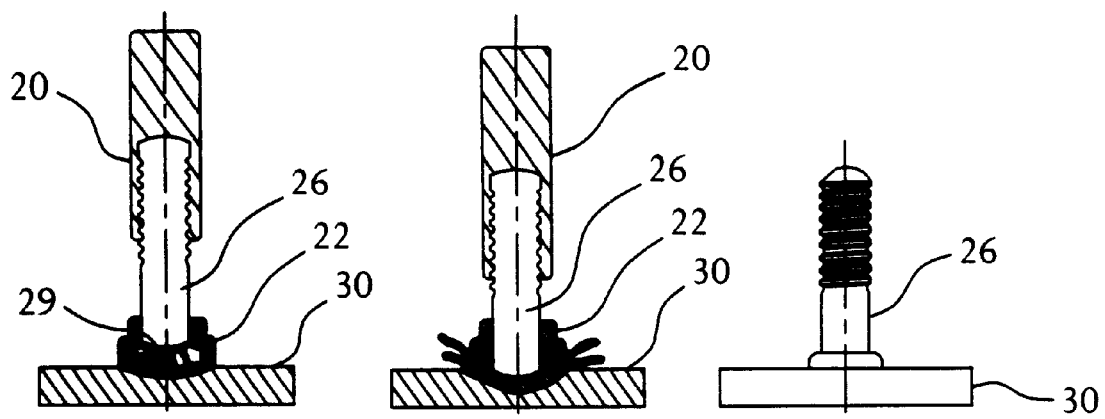
FIG. 4C (PRIOR ART)  FIG. 4D (PRIOR ART)  FIG. 4E (PRIOR ART)

SYSTEMS FOR ROBOTIC STUD ARC WELDING WITHOUT FERRULE

FIELD OF THE INVENTION

The present invention relates generally to welding systems. More particularly, the present invention relates to systems for robotic stud arc welding of large studs without the use of a ferrule.

BACKGROUND OF THE INVENTION

Stud welding is a process in which the contact surfaces of a stud, or similar fastener, and a workpiece, are heated and melted by an arc drawn between them. The stud is then plunged rapidly onto the receiving surface of the workpiece to form a weld. Arc initiation, arc time, and plunging are controlled automatically.

Two basic methods of stud welding are known as stud arc welding and capacitor discharge stud welding. Both methods usually involve direct current and arcing. A conventional stud arc welding system 10 is shown in FIG. 1. As shown, system 10 can include an electrical input 12 for incoming, three-phase power. Input 12 is connected through a fused disconnect switch 14 to a power/control unit 16. For stud arc welding, a motor-generator, a transformer-rectifier, or a storage battery can provide the power supply. The power supply for capacitor discharge stud welding is typically a low-voltage electrostatic storage system, and the arc is produced by a rapid discharge of stored electrical energy.

Control unit 16 includes a welding current controller and is coupled to a welding tool 18, which is usually a stud gun. Stud gun 18 typically includes a chuck or collet 20 into which a stud 26 can be received. In the arc method, a ceramic arc shield 22 (which is commonly known as a "ferrule") is generally used to shield the arc and retain the molten weld metal. Where a ferrule is used, stud gun 18 includes a ferrule holder 24 to hold ferrule 22 in place during the welding process. Control unit 16 can also be coupled to a work clamp 28 that holds workpiece 30 in place during the welding process.

In both methods, the stud serves as the electrode, while the gun is the electrode holder. Flux is generally used for stud arc welding of ferrous alloys and is an integral part of the stud. Flux provides cleaning action, arc stability, and a protective atmosphere. The arc time for capacitor discharge welding is so short that flux is not needed. Typically, in arc welding applications, a shielding or "assist" gas is introduced. Assist gas is typically not required with the capacitor discharge method.

Two types of stud arc welding guns that are commonly used are known as "portable" and "fixed" (i.e., production type). The principle of operation is the same for both. A portable or hand-held stud gun resembles a pistol, and is usually designed to be lightweight and durable. For example, a small gun used for welding ⅛ to ½ in. diameter studs can weigh approximately 4½ lb. A larger gun, weighing approximately 11 lb, can be used for welding ⅝ to 1¼-in. diameter studs. Typical gun bodies are made of high-impact strength plastic. FIG. 2 is a schematic drawing illustrating a hand-held stud arc welding gun. Stud arc welding guns can also incorporate a means for causing the stud to plunge or move slowly as it enters the molten pool of metal at the completion of the weld. This cushioning effect reduces weld splatter considerably and also improves weld integrity.

As shown in FIG. 2, stud gun 18 has a fixed core 44 and a movable core 46. Fixed core 44 is fixed to the rear end of stud gun 18, while movable core 46 is aligned with fixed core 44 along gun axis 43, and is situated toward the distal end of stud gun 18. An air gap 52 exists between fixed core 44 and movable core 46 to enable movable core 46 to move along gun axis 43. Stud gun 18 also includes a solenoid 42, and clutch assembly 38, and a lifting rod 36 that cooperate to move movable core 46 during the welding process.

Stud gun 18 can also include a foot 34 disposed on a distal end of a leg 32 that extends from the main body of stud gun 18. Foot 34 surrounds stud 26 between ferrule 22 and chuck 20. Stud gun 18 can be coupled to the power/control unit trigger via a control cable 50 and a weld cable 48. A trigger switch 40 is used to initiate the arc welding process.

Stud arc welding systems with automatic feed are available with both portable and fixed welding guns. A hand-held gun 18' with an automatic stud feed attachment 52 is depicted in FIG. 3. Typically, studs are automatically oriented in a parts feeder and transferred through a flexible feed tube into the welding gun chuck. A ferrule or arc shield is hand-loaded for each weld. For special applications, inert gas shielding or a semi-permanent ferrule is used to eliminate the loading of a ferrule for each weld. Using automatic feed systems such as this, welding rates in the range of 20 to 45 studs per minute can be obtained.

Capacitor discharge stud welding, because no ceramic ferrule is required, is suited for high-speed automatic stud feed applications. Portable capacitor discharge equipment with automatic stud feed is available for studs ranging from No. 6 through ¼ in. diam. Studs are automatically oriented in a parts feeder and transferred through a flexible feed tube into the welding gun chuck. The automatic feed attachments add very little weight to the gun and do not encumber its use. Welding rates with portable equipment range up to 60 studs per minute on applications where stud location tolerances are such that no templating or only a loose-fitting templating is required.

Typically, in the arc welding method, larger studs (i.e., studs having a diameter greater than about ⅜") are welded using a ceramic ferrule. The main reason for the ferrule is to control the shape of the weld puddle. In these systems, the studs and ferrules are loaded manually as it is very difficult to feed the brittle ceramic ferrules. Similarly, the remains of the ferrule need to be removed manually after the weld process. This results in a slow process, and tedious, labor intensive work.

Ferrules are required for the stud arc welding process except under highly specialized conditions. The ferrule surrounds the weld area and performs several important functions during the weld cycle, such as concentrating the heat of the arc in the weld area during the weld, reducing oxidation of the molten metal during welding by restricting passage of air into the weld area, and confining the molten metal to the weld area. The ferrule also protects the eyes of the operator from the arc; however, safety glasses with side shields and shade No. 3 filter lenses are recommended.

Two types of ferrules are used: expendable and semipermanent. The expendable ferrule has the broadest commercial use. It is composed of a ceramic material and breaks easily for removal. Because the expendable ferrule is designed for only one weld, it is much smaller, and its design, relative to venting and fillet cavity dimensions, can be optimized. Better fillet control and weld quality can be achieved with the expendable ferrule than with the semipermanent ferrule. Stud shape is not limited, because the ferrule does not have to slip over the stud shank of the welded stud for removal.

The semipermanent ferrule is seldom used and is suitable for special applications involving automatic stud feed systems in which fillet control is not important. The number of welds that can be obtained with a semipermanent ferrule varies considerably, depending on the stud diameter, weld setup, and weld rate, but is generally between 2500 and 7500. The ferrule fails because of the gradual erosion of the ferrule material by the molten metal, causing welds to become unacceptable.

FIGS. 4A–4E depict a conventional stud arc welding sequence in which a ferrule is used. The welding sequence begins by loading stud 26 into chuck 20 and a ferrule 22 into the ferrule holder. The relationship between stud 26 and ferrule 22 prior to positioning stud 26 on workpiece 30 is shown in FIG. 4A. Stud 26 protrudes beyond ferrule 22 (by a distance d known as a "plunge") to allow for stud burnoff and to enable stud 26 to plunge fully into the molten metal once the arcing time is completed. Stud 26 and ferrule 22 are then placed on a receiving surface of workpiece 30 as shown in FIG. 4B.

With stud 26 now flush with the face of ferrule 22, a mainspring in stud gun 18 (FIG. 2) is compressed. When trigger switch 40 is operated, solenoid coil 42 is energized, causing stud 26 to lift from workpiece 30 and create an arc 29 as shown in FIG. 4C. The heat from arc 29 causes both stud 26 and a portion of the receiving surface of workpiece 30 to melt. When the arc period, as preset and maintained by control unit 16, is completed, solenoid coil 42 is de-energized, and the weld current is automatically shut off. De-energizing solenoid coil 42 allows the mainspring in stud gun 18 to force stud 26 into the molten pool on workpiece 30 to complete the weld (see FIG. 4D). Stud gun 18 is then lifted from the welded stud, and ferrule 22 is removed. FIG. 4E shows stud 26 in place on workpiece 30 after the weld has been competed and ferrule 22 removed.

In robotic stud welding applications, a stud welding gun is attached to a robot which is programmed to position the gun to the desired weld location and to automatically produce stud welds, without the need for an operator. In a conventional automated stud welding system, system resource utility lines or cables are typically fed directly into the stud welding gun. For example, a stud feed tube, i.e., a hollow utility line or cable, may be fed directly into a stud welding gun to transfer a plurality of studs from a remote stud feeder to the stud welding gun. The remote stud feeder may provide air pressure to transport the studs through the feed tube. As the stud welding gun receives the flow of studs, the stud welding operation may be continuously performed. Another utility line or cable may also be fed directly into the stud welding gun for providing the gun with a weld current. Usually, this cable will extend from a remote power source/controller, providing the necessary current and its duration. Other utility lines may also extend directly into the gun, e.g., pneumatic lines for operating the gun, air or liquid lines for cleaning the weld surface, etc.

A detailed description of stud welding apparatus and methods is provided in "Stud Welding," American Society of Metals Handbook, Vol. 6.

Although robotic stud welding systems are known for welding smaller diameter studs, the use of ferrules in the arc welding of larger diameter studs has heretofore prevented the development of robotic systems for arc welding such studs. Thus, there is a need in the art for a robotic stud arc welding system capable of automatically arc welding larger diameter studs to a receiving surface without the use of a ferrule.

SUMMARY OF THE INVENTION

The present invention satisfies these needs in the art by providing systems for robotic arc welding of large studs (i.e., studs having a diameter of greater than about $3/8$ inch) to a workpiece using suitable assist gas without the use of a ferrule. Apparatus for arc welding a stud to a workpiece without the use of a ferrule comprises a stud arc welding gun having a spacer at a distal end thereof, and a chuck adapted to receive a stud having a diameter of more than about $3/8$ inch.

A stud feeding device is coupled to the gun for automatically loading studs into the gun. The stud feeding device determines whether a stud is loaded into the gun and, if no stud is loaded into the gun, automatically loads a stud into the gun. The stud feeding device can determine a proper orientation of the stud and load the stud into the chuck in the proper orientation. The stud feeding device can include a bowl feeder in which a plurality of studs is stored, and a stud feeding conduit that couples the stud gun with the bowl feeder, via which studs are transferred from the bowl feeder to the stud gun.

A gun positioning device, such as an arm of a robot, is coupled to the gun, and automatically positions the gun such that the spacer is against a first receiving area of the workpiece. A controller coupled to the stud gun initiates a stud arc welding process to arc weld the stud to the workpiece. The robot can be adapted to weld a plurality of studs by automatically moving the stud gun away from the first receiving area and positioning it at a second receiving area on the same or a different workpiece.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific apparatus and methods disclosed.

FIGS. 4A–4E depict a conventional stud arc welding sequence in which a ferrule is used.

DETAILED DESCRIPTION OF PREFERRED EMBODIMENTS

By using a drawn arc process and suitable assist gas, a system according to the present invention eliminates the need for ceramic ferrules in the stud welding process. It also enables automation of the welding process, as ferrules would no longer need to be changed, and studs can be fed to the system automatically. Assist gas is used to control and stabilize the weld process. This results in less porosity in the weld and, therefore, a stronger joint.

Figure 5:
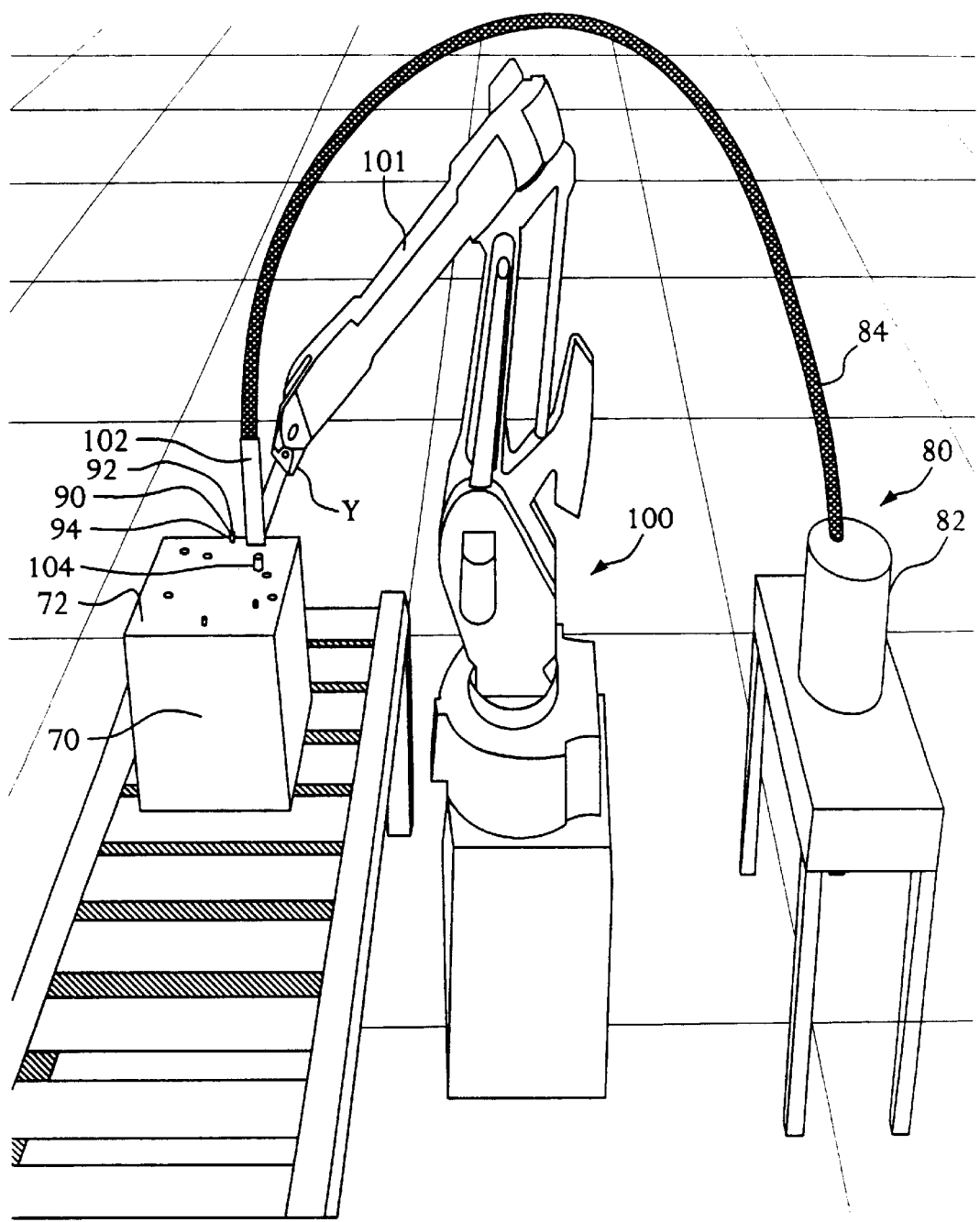
FIG. 5 depicts a robotic stud arc welding system according to the present invention.

In a preferred embodiment shown in FIG. 5, a robot 100 holds a stud arc welding gun 102. A stud feeding device 80 that is coupled to stud gun 102 automatically feeds studs 90 to stud gun 102. Preferably, stud feeding device 80 includes a bowl feeder 82 and a stud feeding conduit 84, such as a tube, that couples stud gun 102 with bowl feeder 82 and via which studs 90 are transferred from bowl feeder 82 to stud gun 102. Preferably, stud feeding device 80 determines whether a stud 90 is loaded into stud gun 102. If not, stud feeding device 80 automatically loads a stud 90 into stud gun 102. Stud feeding device 80 also determines a proper orientation of each stud 90 as it is loaded into stud gun 102. Preferably, each stud has a welding end 92 and a terminal end 94. Consequently, stud loading device 80 orients stud 90 so that when stud 90 is loaded into stud gun 102, terminal end 94 points into stud gun 102, while welding end 92 points out of stud gun 102.

Figure 1:
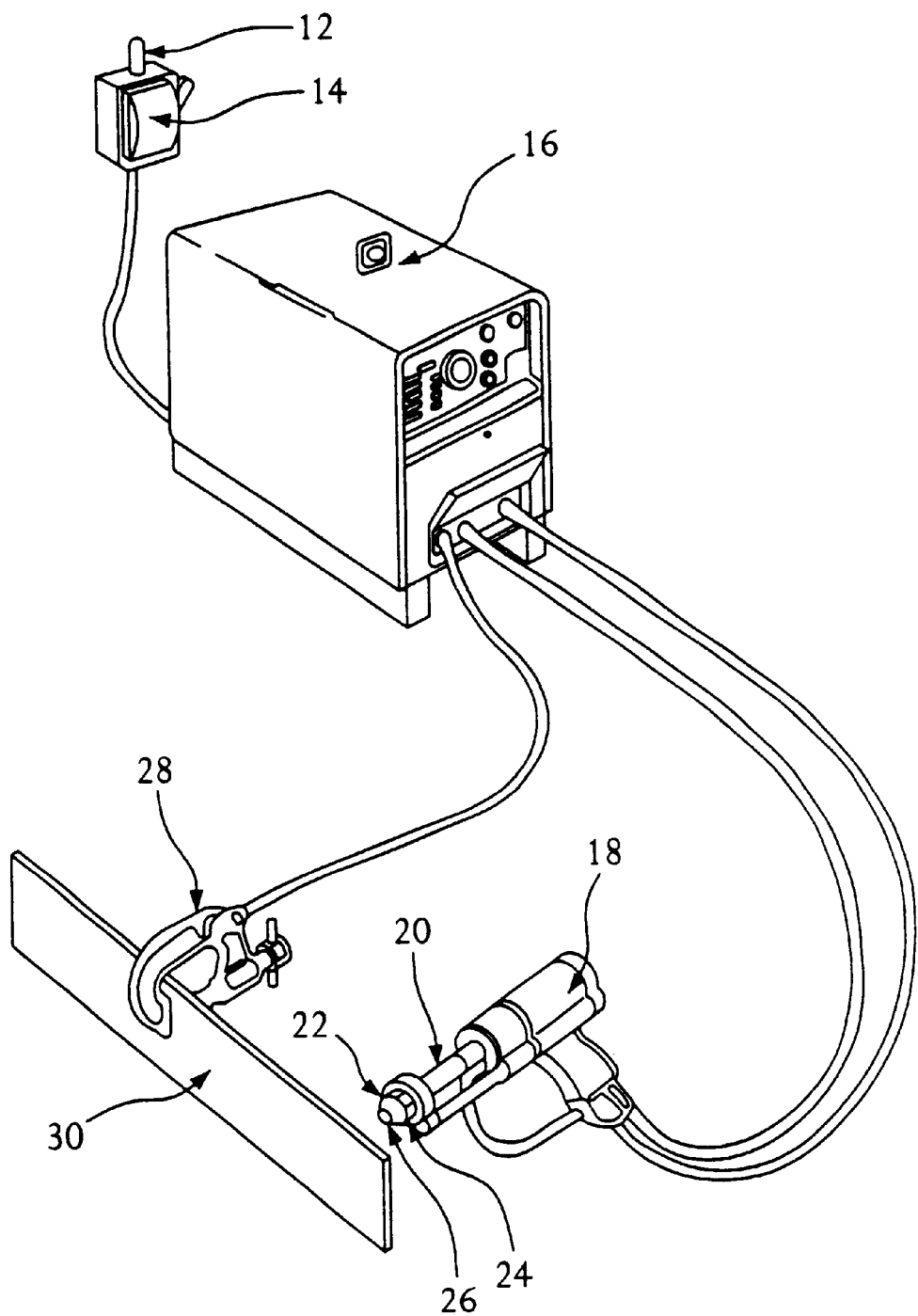
FIG. 1 depicts a conventional stud arc welding system.
Figure 2:
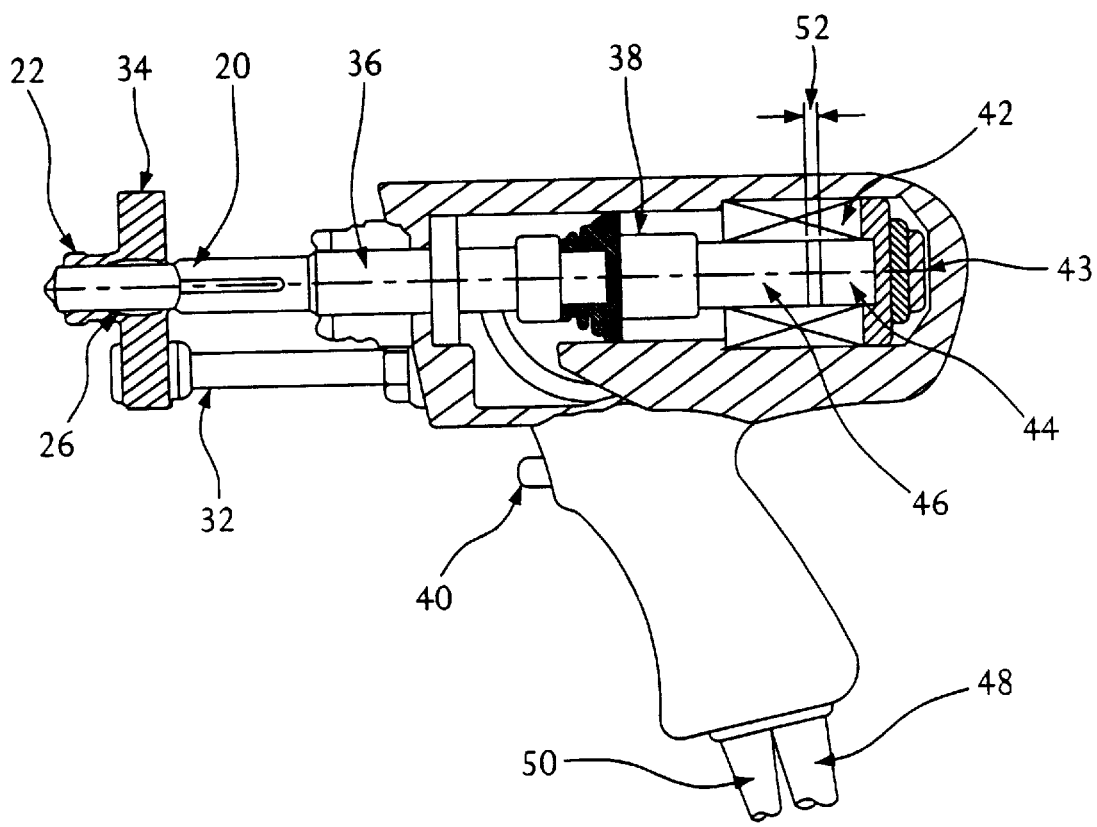
FIG. 2 is a schematic drawing illustrating a hand-held stud arc welding gun.
Figure 3:
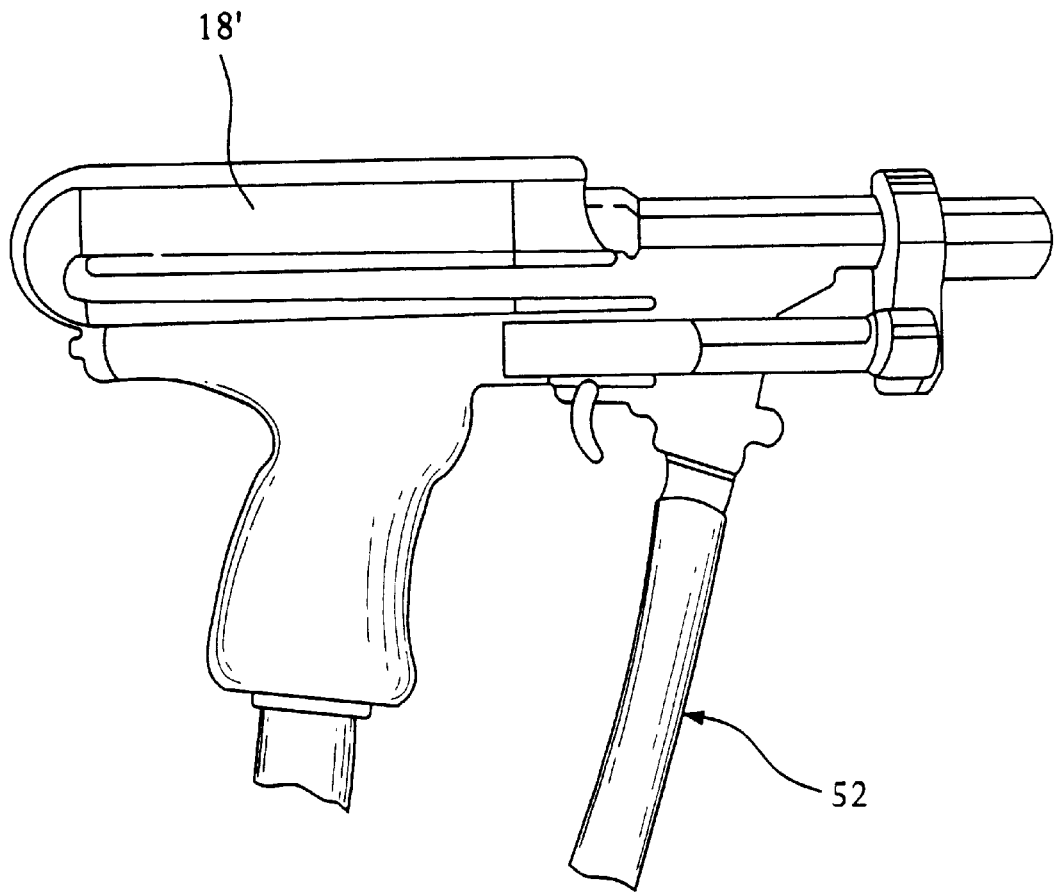
FIG. 3 depicts a hand-held gun with an automatic stud feed attachment.
Figure 6:
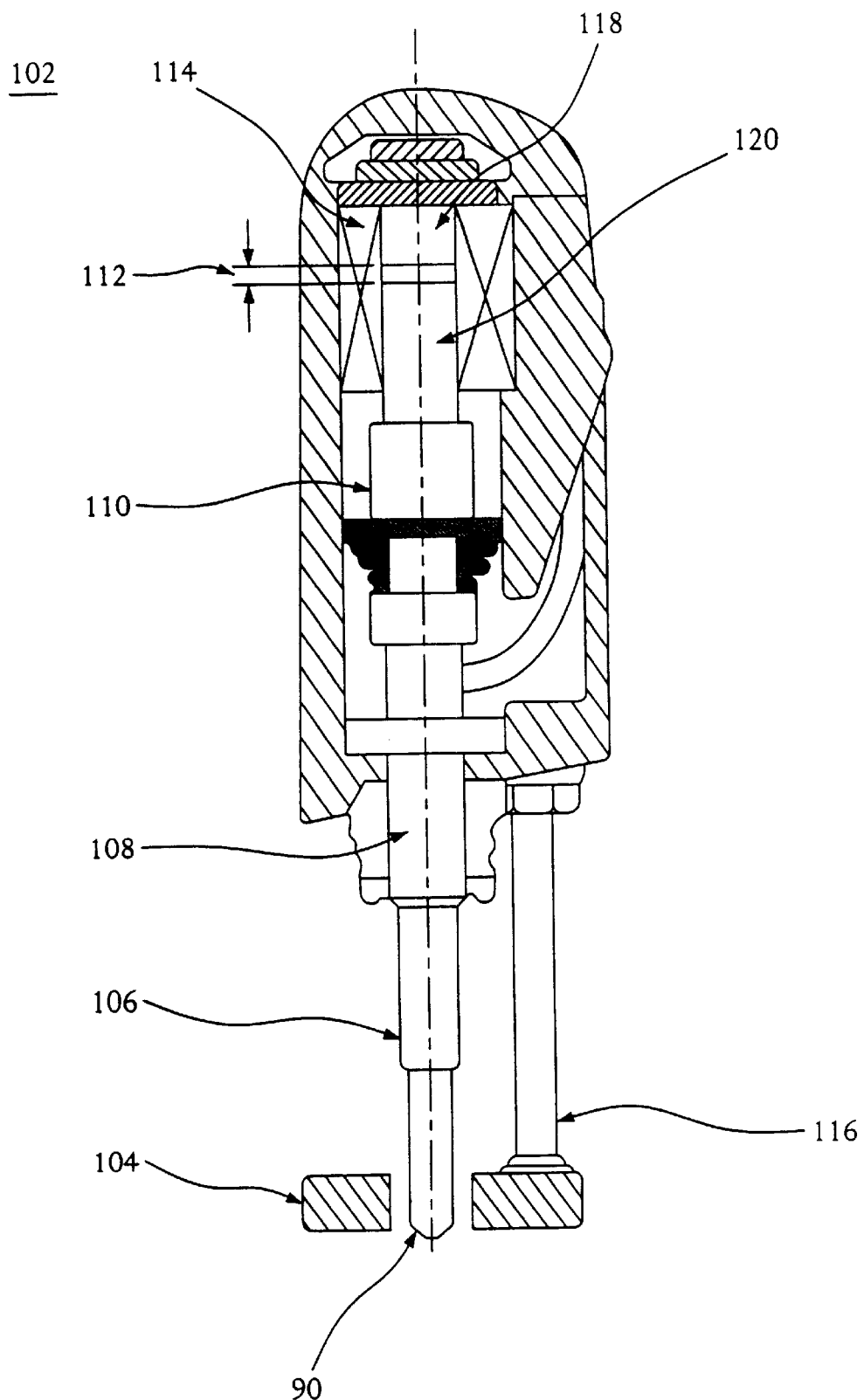
FIG. 6 is a schematic drawing illustrating a stud arc welding gun for use with a robotic system according to the present invention.

FIG. 6 is a schematic drawing illustrating a stud arc welding gun 102 for use with a robotic system according to the present invention. Stud arc welding gun 102 includes a spacer 104. Spacer 104 is disposed at a distal end of stud gun 102, and is coupled to stud gun 102 by way of a spacer leg 116. Stud gun 102 also includes a lifting rod 108, a clutch assembly 110, a solenoid 114, a fixed core 118, and a movable core 120, each of which performs the same functions described above in connection with FIG. 2. Again, an air gap 112 exists between fixed core 118 and movable core 120 so that movable core 120 can moved toward or away from the workpiece as needed during the arc welding process.

Stud gun 102 also includes a chuck 106 that is adapted to receive a stud 90 having a diameter of more than about ⅜ inch. As shown in FIG. 5, stud gun 102 is loaded with a stud 90. Stud feeding tube 84 is coupled to stud gun 102 such that studs being fed into stud gun 102 are received into chuck 106 in the proper orientation.

With reference once again to FIG. 5, stud gun 102 is preferably coupled to a gun positioning device 101, such as, for example, an arm of robot 100. In use, positioning device 101 automatically positions stud gun 102 such that spacer 104 is against a receiving surface 72 of workpiece 70. Preferably, an air cylinder is disposed between robot 100 and stud gun 102. Robot 100 brings stud gun 102 relatively close (e.g., about 1–2 inches) to receiving surface 72. Thereafter, the air cylinder moves stud gun 102 to bring spacer 104 into contact with receiving surface 72. Such an air cylinder is desirable in that it ensures linear movement when moving stud gun 102 into contact with, and away from, workpiece 70. Robot 100 can also be programmed to weld multiple studs onto the same workpiece.

Figure 7A:
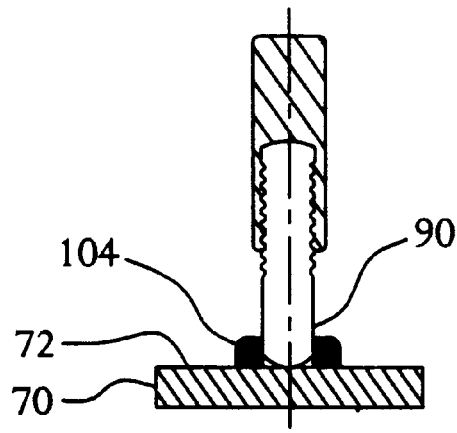
FIGS. 7A–7D depict a stud arc welding sequence according to the present invention in which a ferrule is not used.
Figure 7B:
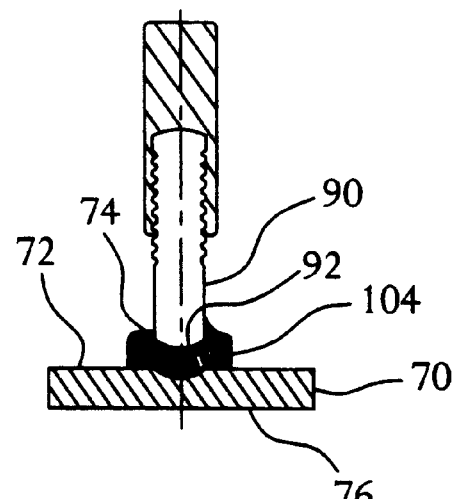
Figure 7C:
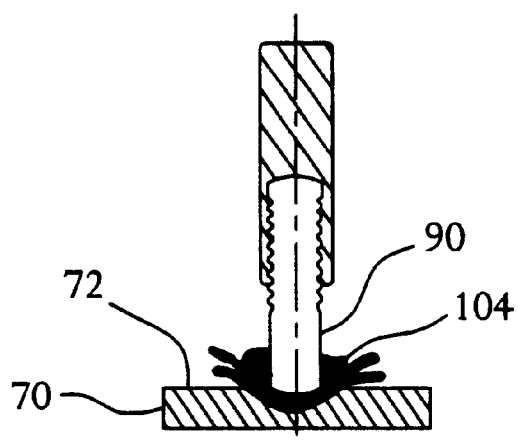
Figure 7D:
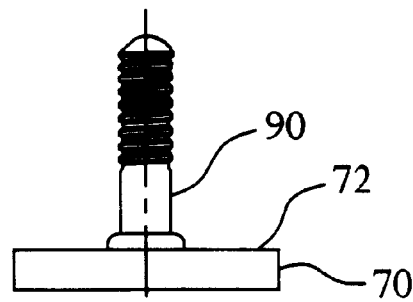

FIGS. 7A–7D depict a stud arc welding sequence according to the present invention in which a ferrule is not used. FIG. 7A depicts stud 90 in a weld position in which spacer 104 and stud 90 have both been moved into contact with receiving surface 72 of workpiece 70. FIG. 7B depicts stud 90 lifted off receiving surface 72, whereby a weld arc 74 is initiated. Weld arc 74 melts a portion 76 of receiving surface 72, as well as a portion of welding end 92 of stud 90. As shown in FIG. 7C, after the arc period is complete, stud 90 is plunged into the molten pool of metal on receiving surface 72. FIG. 7D shows stud 90 in place on workpiece 70 after the weld has been competed. Notably, as there is no ferrule to remove after the weld is complete, the gun positioning device can automatically move the stud gun away from the first receiving area and position it at a second receiving area on the same or a different workpiece.

The elimination of the need to use ferrules can provide many benefits. First, a cost savings can be realized, because ferrules typically cost much more than assist gas. Second, cycle time can be reduced since the system no longer requires manual handling of ferrules. Similarly, the system provides a labor savings since the studs can be fed automatically, rather than manually, and the welding process itself can be robotized. Additionally, automation is enabled by the use of a gas shield instead of ferrules.

Thus there have been described systems for robotic stud arc welding without the use of a ferrule. Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

I claim:

1. Apparatus for arc welding a stud to a workpiece without the use of a ferrule, comprising:

a stud arc welding gun having a spacer at a distal end thereof and a chuck adapted to receive a stud having a diameter of more than about ⅜ inch;

a stud feeding device coupled to the gun that automatically loads studs into the gun;

a gun positioning device coupled to the gun that automatically positions the gun such that the spacer is against a first receiving area of the workpiece; and a controller coupled to the stud gun that initiates a stud arc welding process to arc weld the stud to the workpiece.

2. Apparatus according to claim 1, wherein the stud feeding device determines whether a stud is loaded into the gun and, if no stud is loaded into the gun, automatically loads a stud into the gun.

3. Apparatus according to claim 1, wherein the stud feeding device determines a proper orientation of the stud and loads the stud into the chuck in the proper orientation.

4. Apparatus according to claim 1, wherein the stud feeding device comprises a bowl feeder in which a plurality of studs is stored; and a stud feeding conduit that couples the stud gun with the bowl feeder, via which studs are transferred from the bowl feeder to the stud gun.

5. Apparatus according to claim 1, wherein the gun is coupled to an arm of a robot that is adapted to position the gun such that the spacer is against the receiving surface.

6. Apparatus according to claim 5, wherein the robot is adapted to automatically move the stud gun away from the first receiving area and to position it at a second receiving area on the same or a different workpiece.

7. A method for arc welding a stud to a workpiece without the use of a ferrule, comprising:

providing a stud arc welding gun having a spacer at a distal end thereof and a chuck adapted to receive a stud having a diameter of more than about ⅜ inch;

loading a stud into the gun;

moving the gun proximate a receiving area on a surface of a workpiece onto which a stud is to be welded; and arc welding the stud to the surface.

8. The method according to claim 7, wherein loading the stud into the gun comprises automatically loading the stud into the gun via a stud feeding device that is coupled to the gun.

9. The method according to claim 8, wherein automatically loading the stud into the gun comprises the stud feeding device determining whether a stud is loaded into the gun, and if no stud is loaded into the gun, automatically loading the stud into the gun.

10. The method according to claim 8, wherein automatically loading the stud into the gun comprises the stud feeding device determining a proper orientation of a stud and loading the stud into the chuck in the proper orientation.

11. The method according to claim 8, further comprising:
   providing a stud feeding device comprising a bowl feeder in which a plurality of studs is stored;
   coupling the gun with the bowl feeder via a stud feeding conduit; and
   transferring studs from the bowl feeder to the gun via the conduit.

12. The method according to claim 7, further comprising coupling the gun to an arm of a robot that is adapted to position the gun such that the spacer is against the surface of the workpiece.

13. The method according to claim 12, further comprising adapting the robot to move the gun away from a first receiving area and to position it at a second receiving area on the same or a different workpiece.

* * * * *